(12) United States Patent
Tamane et al.

(10) Patent No.: US 10,607,429 B2
(45) Date of Patent: Mar. 31, 2020

(54) ONBOARD DEVICE AND MOBILE TERMINAL

(71) Applicants: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-Gun, Aichi (JP)

(72) Inventors: Yasuyuki Tamane, Miyoshi (JP); Tsukasa Takahashi, Tokyo (JP); Masaki Oshima, Aichi-ken (JP)

(73) Assignees: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 0 days.

(21) Appl. No.: 16/108,697

(22) Filed: Aug. 22, 2018

(65) Prior Publication Data

US 2019/0122466 A1     Apr. 25, 2019

(30) Foreign Application Priority Data

Oct. 23, 2017  (JP) ................................ 2017-204742

(51) Int. Cl.
*G07C 9/00* (2020.01)
*H04L 29/06* (2006.01)

(52) U.S. Cl.
CPC ..... *G07C 9/00309* (2013.01); *G07C 9/00817* (2013.01); *H04L 63/0876* (2013.01); *G07C 2009/00373* (2013.01); *G07C 2009/00825* (2013.01)

(58) Field of Classification Search
CPC .......... G07C 2009/00373; G07C 2009/00825; G07C 9/00309; G07C 9/00817; H04L 63/0876

See application file for complete search history.

(56) References Cited

U.S. PATENT DOCUMENTS

| 2008/0012693 A1* | 1/2008 | Shimomura | .......... B60R 25/102 340/426.1 |
| 2009/0015202 A1* | 1/2009 | Miura | .................... B60W 10/26 320/132 |
| 2013/0132939 A1* | 5/2013 | Murata | .................... H02J 7/041 717/173 |

FOREIGN PATENT DOCUMENTS

JP         2004-326689 A      11/2004

* cited by examiner

*Primary Examiner* — Omeed Alizada
(74) *Attorney, Agent, or Firm* — Dinsmore & Shohl LLP (57) ABSTRACT

An onboard device includes a storage unit configured to store a control program for controlling the onboard device and a communication unit configured to perform data communication with a mobile terminal. The communication unit performs data communication of a rewriting program with the mobile terminal when the communication unit has received a rewriting notification signal indicating rewriting of the control program stored from the mobile terminal and the vehicle is in a chargeable state in which the battery is able to be charged by the power generator. The communication unit does not perform data communication of the rewriting program with the mobile terminal when the vehicle is not in the chargeable state.

6 Claims, 6 Drawing Sheets

ONBOARD DEVICE AND MOBILE TERMINAL

CROSS-REFERENCE TO RELATED APPLICATIONS

This application claims priority to Japanese Patent Application No. 2017-204742 filed on Oct. 23, 2017, which is incorporated herein by reference in its entirety including the specification, drawings and abstract.

BACKGROUND

1. Technical Field

The disclosure relates to an onboard device that is supplied with electric power from a battery of a vehicle and a mobile terminal that performs data communication with the onboard device.

2. Description of Related Art

An onboard device which is mounted in a vehicle and of which a predetermined function is realized by executing a control program stored in a storage unit is known. In such an onboard device, rewriting (such as updating) of the control program stored in the storage unit may be carried out.

Japanese Unexamined Patent Application Publication No. 2004-326689 (JP 2004-326689 A) discloses a technique associated with rewriting of a control program (software) in such an onboard device. In the technique disclosed in JP 2004-326689 A, a rewriting program (rewriting software) for the onboard device which is wirelessly transmitted from a service center is received and downloaded by a communication terminal of a vehicle via a mobile communication network.

SUMMARY

An onboard device is supplied with electric power from a battery mounted in a vehicle. When rewriting of a control program in the onboard device is carried out, a rewriting program may be acquired by data communication with a mobile terminal. At this time, when a data volume of the rewriting program is large, a relatively long time is required for completion of data communication of the rewriting program between the mobile terminal and the onboard device after the data communication has been started. Accordingly, when data communication of the rewriting program between the mobile terminal and the onboard device is performed in a state in which the battery in the vehicle is not charged, much electric power is consumed for a reception process in the onboard device and thus there is a likelihood that an amount of electric power remaining in the battery will be excessively small. When the amount of electric power remaining in the battery becomes excessively small in this way, there is a likelihood that the amount of electric power remaining in the battery may become insufficient during execution of data communication of a rewriting program or during execution of control program rewriting in the onboard device and the data communication of the rewriting program or the rewriting of the control program may be unintentionally stopped.

The disclosure provides an onboard device and a mobile terminal that can prevent an amount of electric power remaining in a battery that supplies electric power to the onboard device from becoming excessively small during execution of data communication of a rewriting program between the onboard device and the mobile terminal when a control program of the onboard device is rewritten.

An onboard device according to a first aspect of the disclosure is mounted in a vehicle including a battery and a power generator that charges the battery and is supplied with electric power from the battery of the vehicle. The onboard device includes a storage unit configured to store a control program for controlling the onboard device and a communication unit configured to perform data communication with a mobile terminal. The communication unit performs data communication of a rewriting program with the mobile terminal when the communication unit has received a rewriting notification signal indicating rewriting of the control program stored in the storage unit from the mobile terminal and the vehicle is in a chargeable state in which the battery is able to be charged by the power generator, and the communication unit does not perform data communication of the rewriting program with the mobile terminal when the vehicle is not in the chargeable state.

In this aspect, when the control program stored in the storage unit of the onboard device is rewritten, the rewriting notification signal is transmitted from the mobile terminal to the onboard device. Data communication of the rewriting program between the communication unit and the mobile terminal is performed only when the communication unit of the onboard device has received the rewriting notification signal transmitted from the mobile terminal and the vehicle is in the chargeable state. Here, the chargeable state is a state in which the battery can be charged by the power generator when electric power of the battery is used up. According to this configuration, when the electric power of the battery has been consumed due to the data communication of the rewriting program between the mobile terminal and the communication unit, the battery can be charged by the power generator.

Therefore, according to this aspect, it is possible to prevent an amount of electric power remaining in the battery from becoming excessively small due to data communication of the rewriting program between the onboard device and the mobile terminal.

In the aspect, the vehicle may include an internal combustion engine, the power generator may generate electric power using a driving force from the internal combustion engine, the onboard device may further include a reception unit configured to receive a drive notification signal from the vehicle when the internal combustion engine in the vehicle is being driven, the communication unit may perform data communication of the rewriting program with the mobile terminal when the communication unit has received the rewriting notification signal from the mobile terminal and the drive notification signal is being received by the reception unit, and the communication unit may not perform data communication of the rewriting program with the mobile terminal when the drive notification signal is not being received by the reception unit. According to this configuration, data communication of the rewriting program with the mobile terminal is performed when the vehicle is in the chargeable state, and data communication of the rewriting program with the mobile terminal is not performed when the vehicle is not in the chargeable state.

In the aspect, when the vehicle in the chargeable state departs from the chargeable state during execution of data communication of the rewriting program between the communication unit and the mobile terminal or during execution of rewriting of the control program in the storage unit, data communication of the rewriting program between the communication unit and the mobile terminal or rewriting of the control program in the storage unit may be stopped.

In this case, data communication of the rewriting program or rewriting of the control program is intentionally stopped. Accordingly, it is possible to prevent the data communication or rewriting of the control program from being unintentionally stopped due to an insufficient amount of electric power remaining in the battery during execution of the data communication of the rewriting program or during execution of rewriting of the control program in the storage unit.

In the aspect, the onboard device may be a key unit configured to lock and unlock the vehicle, the key unit may include a transmission unit configured to transmit a locking/unlocking signal to a locking/unlocking device of the vehicle and an authentication unit configured to perform authentication using authentication information of the mobile terminal acquired through data communication by the communication unit, and the key unit may transmit the locking/unlocking signal from the transmission unit to the locking/unlocking device when the authentication using the authentication information of the mobile terminal by the authentication unit succeeds.

In this configuration, the authentication unit may perform authentication using the authentication information of the mobile terminal acquired through data communication by the communication unit when the communication unit has received the rewriting notification signal from the mobile terminal, and data communication of the rewriting program between the communication unit and the mobile terminal may be performed when the vehicle is m the chargeable state and the authentication using the authentication information of the mobile terminal by the authentication unit succeeds. According to this configuration, it is possible to improve security at the time of rewriting the control program in the key unit.

A mobile terminal according to a second aspect of the disclosure performs data communication with the onboard device according to the first aspect and transmits the rewriting notification signal to the onboard device in response to a user's input operation. The mobile terminal includes a notification unit configured to notify the user of a time required for data communication of the rewriting program between the mobile terminal and the onboard device (that is, a time required for completion of the data communication after the data communication is started). According to this configuration, the user can determine a time point at which the data communication is performed based on the time required for the data communication of the rewriting program which has been notified by the notification unit.

According to the above-mentioned aspects, it is possible to prevent an amount of electric power remaining in a battery that supplies electric power to an onboard device from becoming excessively small during execution of data communication of a rewriting program between the onboard device and a mobile terminal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, specific embodiments of the disclosure will be described with reference to the accompanying drawings. Dimensions, materials, shapes, relative arrangements, and the like of elements described in the embodiments are not intended to limit the technical scope of the present disclosure unless otherwise mentioned.

First Embodiment

Outline of System

Figure 1:
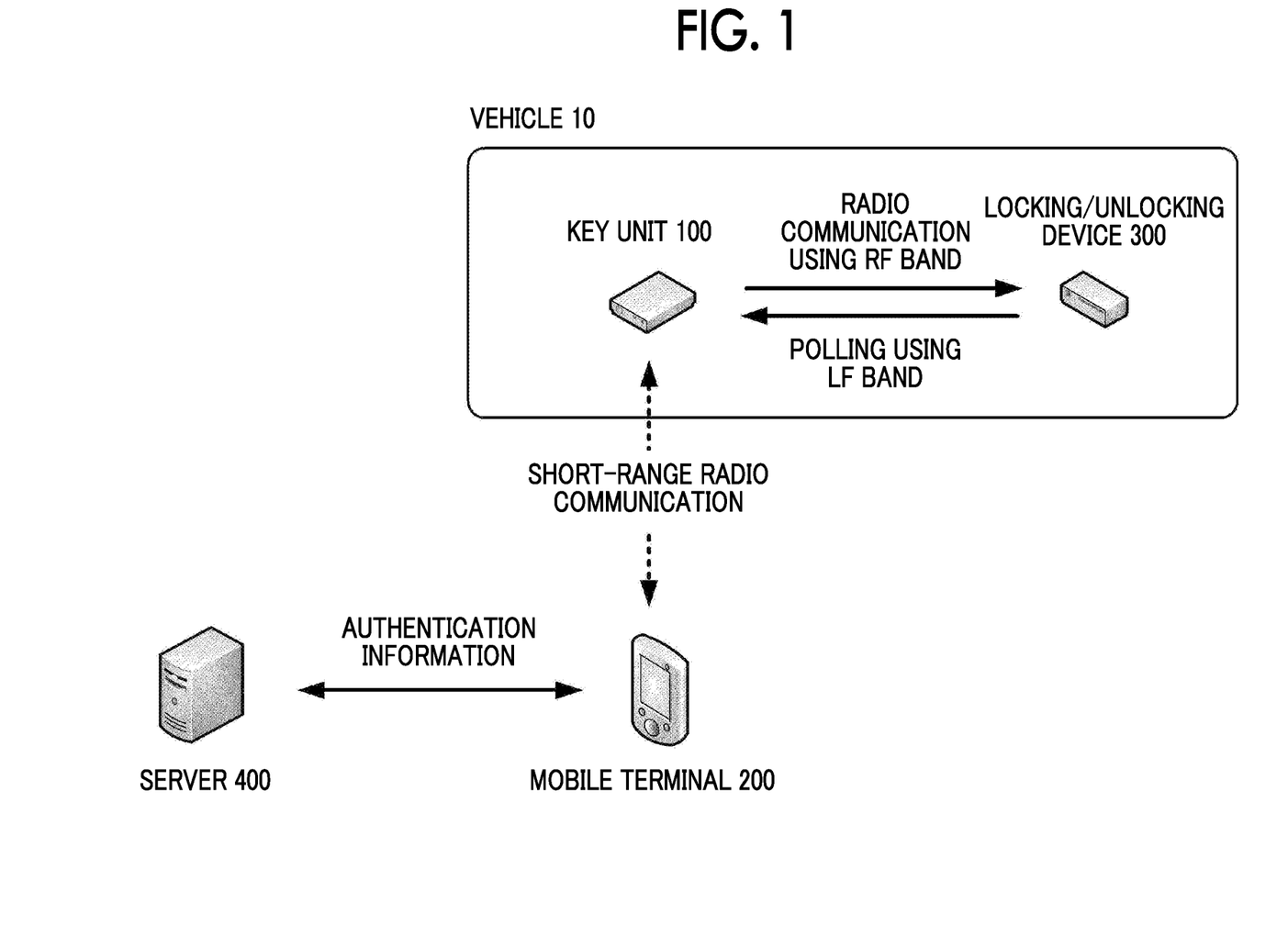
FIG. 1 is a diagram schematically illustrating a locking/unlocking system according to an embodiment.

An embodiment in which the disclosure is applied to a key unit that locks and unlocks a vehicle will be described below. FIG. 1 is a diagram schematically illustrating a configuration of a locking/unlocking system including the key unit according to this embodiment.

The locking/unlocking system according to this embodiment includes a key unit 100 and a locking/unlocking device 300 that are mounted in a vehicle 10, a mobile terminal 200, and a server 400. In the locking/unlocking system according to this embodiment, the key unit 100 includes a radio interface such as an electronic key (a portable unit) such as a smart key and can lock and unlock the vehicle 10 without a physical key being used by communicating with the existing locking/unlocking device 300. The key unit 100 performs short-range radio communication with the mobile terminal 200 and determines whether the key unit operates as an electronic key of the vehicle 10 based on a result of authentication of the mobile terminal 200. That is, a user of the system can lock and unlock the vehicle 10 by operating the mobile terminal 200 from outside of the vehicle 10.

System Configuration

Figure 2:
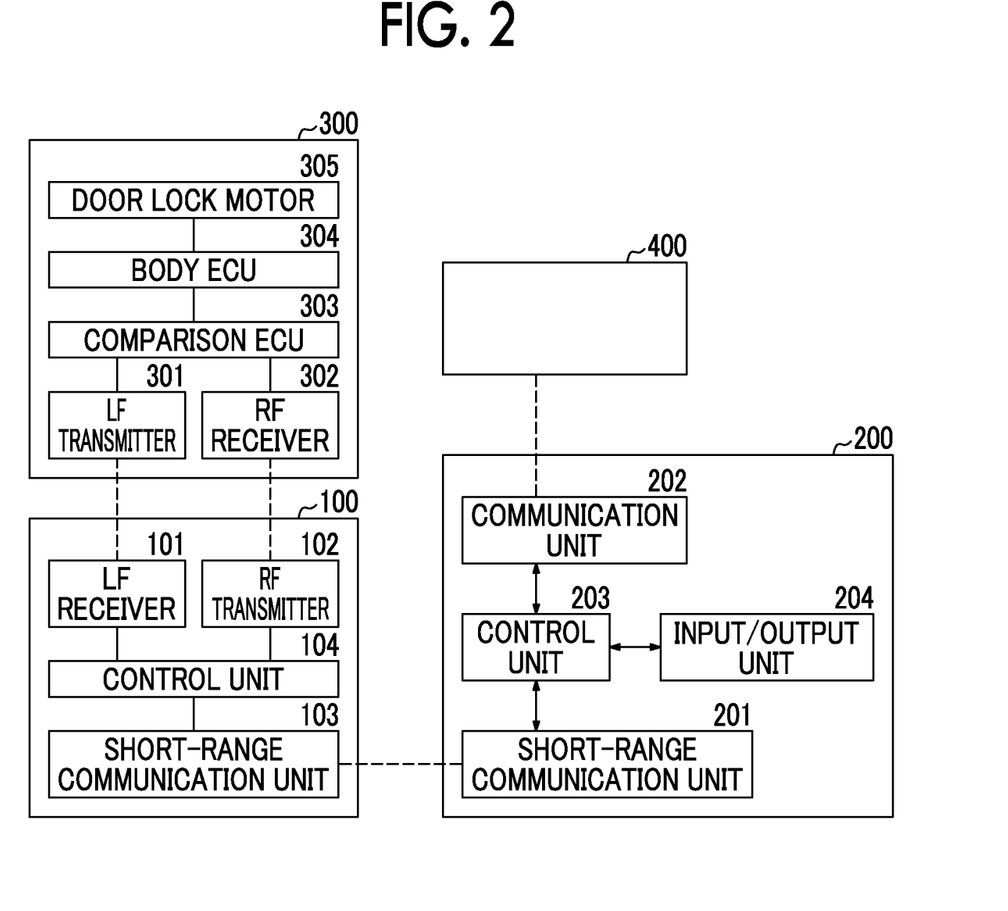
FIG. 2 is a block diagram schematically illustrating elements included in the locking/unlocking system according to the embodiment.

Elements of the system will be described below in detail. FIG. 2 is a block diagram schematically illustrating an example of a configuration of the key unit 100, the mobile terminal 200, the locking/unlocking device 300, and the server 400 which are illustrated in FIG. 1. Among these, the key unit 100 and the locking/unlocking device 300 are mounted in the vehicle 10 which is to be locked/unlocked (locked and unlocked). As will be described later, the key unit 100 and the locking/unlocking device 300 operate with electric power supplied from a battery which is mounted in the vehicle 10.

The locking/unlocking device 300 is a device that locks and unlocks a door of the vehicle 10 and is an existing device that constitutes a part of a smart key system. Specifically, the locking/unlocking device 300 locks and unlocks a door of the vehicle 10 based on a locking signal and an unlocking signal which are transmitted from an electronic key (hereinafter referred to as a portable unit) carried by a user of the vehicle 10 using radio waves of a radio frequency (hereinafter abbreviated to RF) band. The locking/unlocking device 300 also has a function of transmitting radio waves of a low frequency (hereinafter abbreviated to LF) band for searching for the portable unit.

In this embodiment, instead of the portable unit carried by the user, the key unit 100 controls locking and locking of the door of the vehicle 10 by transmitting and receiving radio waves of the RF band and radio waves of the LF band to and from the locking/unlocking device 300. In the following description, a communication partner of the locking/unlocking device 300 is limited to the key unit 100 unless mentioned otherwise.

The locking/unlocking device 300 includes an LF transmitter 301, an RF receiver 302, a comparison ECU 303, a body ECU 304, and a door lock motor 305. The LF transmitter 301 transmits radio waves of an LF band (for example, 100 KHz to 300 KHz) for searching for (polling) the key unit 100. The LF transmitter 301 is incorporated, for example, in the vicinity of a center console or a steering wheel inside the vehicle. The RF receiver 302 receives radio waves of the RF band (for example, 100 MHz to 1 GHz) transmitted from the key unit 100. The RF receiver 302 is incorporated at any position inside the vehicle.

The comparison ECU 303 is a computer that performs control of locking and unlocking the door of the vehicle 10 based on a signal (a locking signal or an unlocking signal) transmitted from the key unit 100 using the radio waves of the RF band. The comparison ECU 303 is constituted, for example, by a microcomputer. In the following description, the locking signal and the unlocking signal are generically referred to as a locking/unlocking signal. The term, locking/unlocking signal, denotes at least one of the locking signal and the unlocking signal.

The comparison ECU 303 authenticates the locking/unlocking signal transmitted from the key unit 100 regarding whether the locking/unlocking signal is transmitted from a valid device. Specifically, the comparison ECU 303 determines whether a key ID included in the locking/unlocking signal matches a key ID stored in advance in a storage unit of the comparison ECU 303. The comparison ECU 303 transmits an unlocking command or a locking command to the body ECU 304 based on the authentication result. The unlocking command or the locking command is transmitted via an onboard network such as a controller area network (CAN).

The body ECU 304 is a computer that controls the body of the vehicle 10. The body ECU 304 has a function of unlocking or locking the door of the vehicle 10 by controlling the door lock motor 305 based on the unlocking command or the locking command received from the comparison ECU 303. The door lock motor 305 is an actuator that locks and unlocks the door of the vehicle 10 (which includes that of a trunk in addition to a boarding/alighting door and a rear gate). The door lock motor 305 operates based on a signal transmitted from the body ECU 304.

The key unit 100 will be described below. The key unit 100 is a device that is disposed at a predetermined position (for example, in a glove box) inside the vehicle 10. The key unit 100 has a function of authenticating a mobile terminal 200 by performing short-range radio communication with the mobile terminal 200 and a function of transmitting a locking/unlocking signal using the radio waves of the RF band based on the authentication result. The key unit 100 includes an LF receiver 101, an RF transmitter 102, a short-range communication unit 103, and a control unit 104.

The LF receiver 101 receives a polling signal transmitted from the locking/unlocking device 300 using radio waves of the LF band. The LF receiver 101 includes an antenna for receiving radio waves of the LF band (hereinafter referred to as an LF antenna). The RF transmitter 102 transmits a locking/unlocking signal to the key unit 100 using radio waves of the RF band. In this embodiment, the RF transmitter 102 is an example of a "transmission unit" in the claims.

The short-range communication unit 103 communicates with the mobile terminal 200 carried by the user. The short-range communication unit 103 performs communication in a short range (a distance over which communication can be performed between the interior and the exterior of the vehicle) using a predetermined radio communication standard. In this embodiment, the short-range communication unit 103 is an example of a "communication unit" in the claims.

In this embodiment, the short-range communication unit 103 performs data communication based on a Bluetooth (registered trademark) low energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but another radio communication standard can also be used. For example, near field communication (NFC), ultra wideband (UWB), or WiFi (registered trademark) may be used.

The control unit 104 is a computer that performs short-range radio communication with the mobile terminal 200 via the short-range communication unit 103 and performs control for authenticating the mobile terminal 200 and control for transmitting a locking/unlocking signal based on the authentication result. The control unit 104 is constituted, for example, by a microcomputer.

Figure 3:
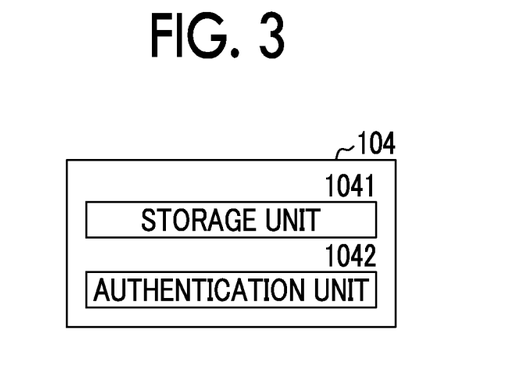
FIG. 3 is a block diagram schematically illustrating some of functional modules included in a control unit of a key unit according to the embodiment.

Functional modules included in the control unit 104 are illustrated in FIG. 3. The control unit 104 includes a storage unit 1041 and an authentication unit 1042. A control program for controlling the key unit 100 is stored in the storage unit 1041. The control unit 104 may embody various functions including the authentication unit 1042 by causing a CPU (not illustrated) to execute the control program stored in the storage unit 1041. For example, the control unit 104 realizes a function of receiving a polling signal transmitted as radio waves of the LF band from the locking/unlocking device 300 via the LF receiver 101, a function of transmitting a locking/unlocking signal as radio waves of the RF band to the locking/unlocking device 300 via the RF transmitter 102, a function of processing communication with the mobile terminal 200 via the short-range communication unit 103, a function of generating a locking/unlocking signal when authentication of the mobile terminal 200 by the authentication unit 1042 succeeds, and the like. In this embodiment, the storage unit 1041 is an example of a "storage unit" in the claims.

The authentication unit 1042 authenticates the mobile terminal 200 based on authentication information included in a locking request or an unlocking request (hereinafter generically referred to as a locking/unlocking request) transmitted from the mobile terminal 200. Specifically, the authentication unit 1042 compares the authentication information transmitted from the mobile terminal 200 with authentication information stored in the storage unit 1041 and determines that the authentication succeeds when both match each other. When both pieces of authentication information do not match each other, the authentication unit 1042 determines that the authentication fails.

When the authentication of the mobile terminal 200 by the authentication unit 1042 succeeds, a locking/unlocking signal generated in response to a request received from the mobile terminal 200 is transmitted to the locking/unlocking device 300 via the RF transmitter 102. The method of authentication performed by the authentication unit 1042 may be a method of simply comparing authentication information pieces and verifying an identity or may be a method using an asymmetric cipher. In the following description, it is assumed that the authentication information stored in the key unit 100 is referred to as device authentication information and the authentication information transmitted from the mobile terminal 200 is referred to as terminal authentication information. In this embodiment, the authentication unit 1042 is an example of an "authentication unit" in the claims.

The key unit 100 transmits an ID of an electronic key (hereinafter referred to as a key ID) along with a locking/unlocking signal to the locking/unlocking device 300. The key ID may be stored in the key unit 100 in a plaintext state in advance or may be stored in an encrypted state using a cipher specific to the mobile terminal 200. When the key ID is stored in an encrypted state, the encrypted key ID may be decrypted using authentication information transmitted from the mobile terminal 200 to acquire the original key ID.

The mobile terminal 200 will be described below. The mobile terminal 200 is a small computer such as a smartphone, a mobile phone, a tablet terminal, a personal digital assistant (PDA), or a wearable computer (such as a smart watch). The mobile terminal 200 includes a short-range communication unit 201, a communication unit 202, a control unit 203, and an input/output unit 204.

The short-range communication unit 201 performs communication with the key unit 100 based on the same communication standard as the short-range communication unit 103. The communication unit 202 connects the mobile terminal 200 to the network. In this embodiment, the mobile terminal can communicate with another device (for example, a server 400) via a network using a mobile communication service such as 3G or LTE.

The control unit 203 is a computer that takes charge of control of the mobile terminal 200. The control unit 203 performs, for example, a process of generating a locking/unlocking request, a process of acquiring the terminal authentication information, and a process of transmitting the locking/unlocking request and the terminal authentication information to the key unit 100. The control unit 203 performs a process of rewriting a control program stored in the storage unit 1041 of the key unit 100 which will be described later in addition to such processes. The control unit 203 is constituted, for example, by a microcomputer. The control unit 203 may embody such functions by causing a CPU (not illustrated) to execute a program stored in a storage unit (such as a ROM) (not illustrated).

The control unit 203 performs an interaction with the user via the input/output unit 204. The input/output unit 204 receives an input operation from the user and presents the user information. Specifically, the input/output unit 204 includes a touch panel and control unit thereof and a liquid crystal display and control unit thereof. The touch panel and the liquid display are embodied as a single touch panel display in this embodiment.

The control unit 203 displays an operation screen on the input/output unit 204 and generates an unlocking request or a locking request in accordance with an operation which is performed by the user. For example, the control unit 203 outputs an icon for unlocking, an icon for locking, and the like on a touch panel display and generates an unlocking request or a locking request based on the operation which is performed by the user. The operation which is performed by the user is not limited to an operation on the touch panel display. For example, a hardware switch may be used.

The control unit 203 performs a process of acquiring terminal authentication information from the server 400. The terminal authentication information is not information which is used for the locking/unlocking device 300 to authenticate the key unit 100, but is information which is used for the key unit 100 to authenticate the mobile terminal 200. Specifically, the control unit 203 transmits a signal for requesting to issue terminal authentication information along with information for identifying the mobile terminal 200 to the server 400 via the communication unit 202. The server 400 having received the signal acquires terminal authentication information specific to the mobile terminal 200 and transmits the acquired terminal authentication information to the mobile terminal 200. Accordingly, an operation of unlocking the vehicle 10 can be performed on the mobile terminal 200. When the mobile terminal 200 does not store terminal authentication information, a locking operation and an unlocking operation on an operation screen cannot be performed.

The terminal authentication information acquired by the mobile terminal 200 may be an invariable key or a one-time key. In any case, device authentication information corresponding to the terminal authentication information is stored in the key unit 100 in advance.

Operation of System

An operation of the locking/unlocking system when the vehicle 10 is locked/unlocked will be described below. When the user of the mobile terminal 200 performs an operation of locking or unlocking the vehicle 10 via the input/output unit 204, the mobile terminal 200 transmits terminal authentication information along with an unlocking request or a locking request based on the user's operation to the key unit 100. The key unit 100 compares the terminal authentication information transmitted from the mobile terminal 200 with device authentication information stored in advance and performs an authentication process.

When this authentication has succeeded, the key unit 100 transmits a key ID along with a locking signal or an unlocking signal to the locking/unlocking device 300. The locking/unlocking device 300 performs an authentication process based on the received key ID. When this authentication has succeeded, the door of the vehicle 10 is locked or unlocked by the locking/unlocking device 300.

System Configuration in Vehicle

Figure 4:
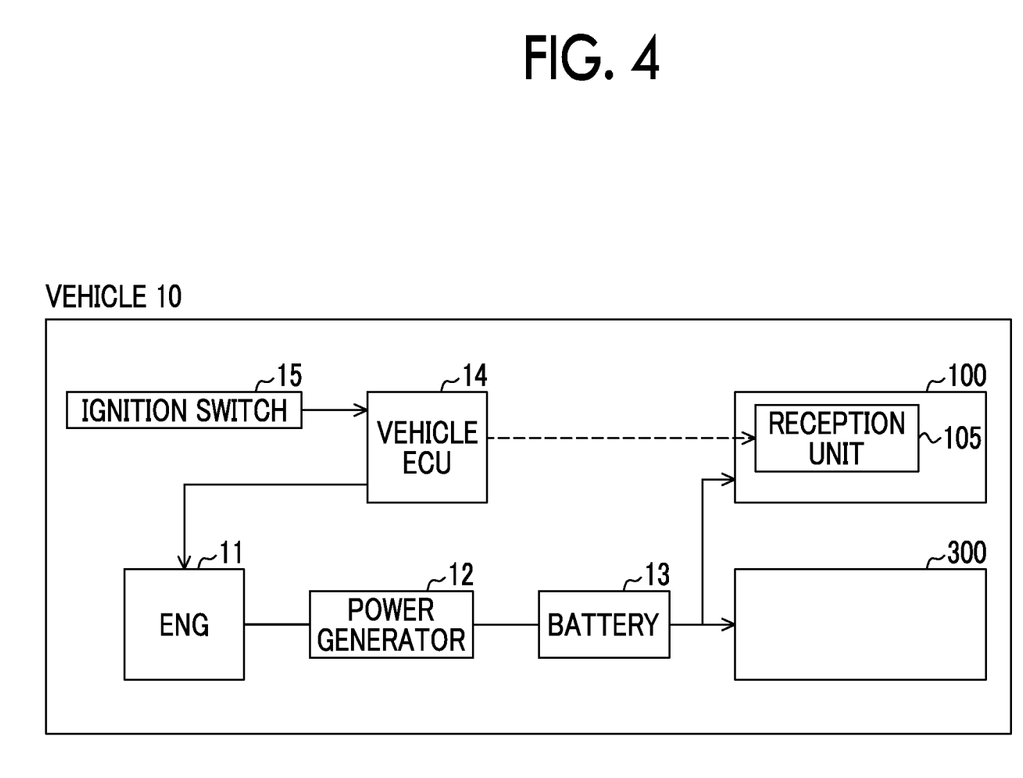
FIG. 4 is a diagram schematically illustrating a system in a vehicle according to the embodiment.

A schematic configuration of a system in the vehicle 10 including the key unit 100 and the locking/unlocking device 300 will be described below with reference to FIG. 4. The vehicle 10 includes an internal combustion engine 11 serving as a drive source. The vehicle 10 also includes a power generator 12, a battery 13, a vehicle ECU 14, and an ignition switch 15.

The power generator 12 is a power generator that generates electric power using a rotary force of a crank shaft of the internal combustion engine 11. That is, the power generator 12 generates electric power using a driving force of the internal combustion engine 11. The battery 13 is charged with electric power generated by the power generator 12. The battery 13 is an auxiliary machine battery that supplies electric power to the vehicle ECU 14 and various electrical components installed in the vehicle 10. As described above, electric power is supplied to the key unit 100 and the locking/unlocking device 300 from the battery 13.

The vehicle ECU 14 is a computer that controls the internal combustion engine 11. The vehicle ECU 14 controls the internal combustion engine 11 based on information input from various sensors installed in the vehicle 10. For example, the ignition switch 15 is electrically connected to the vehicle ECU 14. The vehicle ECU 14 starts the internal combustion engine 11 when the ignition switch 15 is switched from an OFF state to an ON state, and stops the internal combustion engine 11 when the ignition switch 15 is switched from the ON state to the OFF state.

When the ignition switch 15 is in the ON state, the vehicle ECU 14 transmits a drive notification signal, which is a signal indicating that the internal combustion engine 11 is being driven, to the key unit 100. The key unit 100 includes a reception unit 105 that receives the drive notification signal transmitted from the vehicle ECU 14. The control unit 104 of the key unit 100 can determine whether the internal combustion engine 11 is being driven based on whether the reception unit 105 has received the drive notification signal. In this embodiment, the reception unit 105 is an example of a "reception unit" in the claims.

In this embodiment, the key unit 100 performs only an operation of locking and unlocking the vehicle 10, but the key unit 100 may perform an operation other than the locking/unlocking operation. For example, by communicating with the vehicle ECU 14, the key unit 100 may start the internal combustion engine 11. According to this configuration, a conventional portable unit (an electronic key) carried by the user can be completely replaced with the mobile terminal 200.

Rewriting of Control Program

Rewriting of a control program stored in the storage unit 1041 of the control unit 104 of the key unit 100 will be described below. The control program of the key unit 100 may need to be rewritten, for example, similarly to that when the control program has to be updated. In this case, first, a rewriting program is delivered from the server 400 to the mobile terminal 200 of the user. Thereafter, when the user operates the mobile terminal 200, the rewriting program is transmitted from the mobile terminal 200 to the key unit 100. In the key unit 100, rewriting of the control program is performed after reception of the rewriting program from the mobile terminal 200 has been completed.

Figure 5:
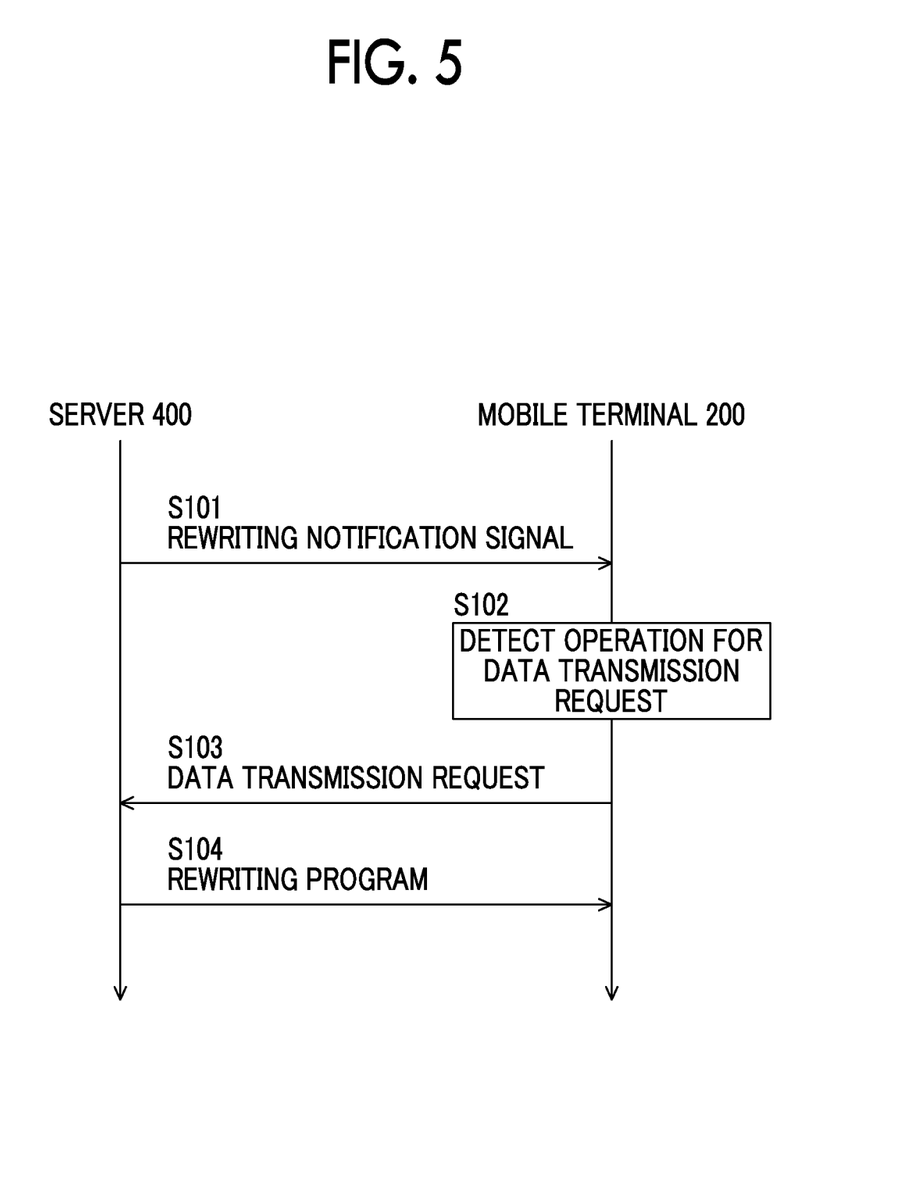
FIG. 5 is a flow diagram illustrating a flow of data communication and processing when a rewriting program is transmitted from a server to a mobile terminal according to a first embodiment.

FIG. 5 is a flow diagram illustrating a flow of data communication and processing when a rewriting program is delivered from the server 400 to the mobile terminal 200. First, a rewriting notification signal indicating rewriting of the control program of the key unit 100 is transmitted from the server 400 to the mobile terminal 200 of the user (push notification) (S101). The rewriting notification signal is received by the communication unit 202 of the mobile terminal 200. When the user performs an operation requesting transmission of data of a rewriting program via the input/output unit 204 in the mobile terminal 200 in response to the rewriting notification signal by the mobile terminal 200, the mobile terminal 200 detects the operation (S102). When this operation is detected, the mobile terminal 200 requests the server 400 to transmit data of the rewriting program (S103). The server 400 having received the request transmits the rewriting program to the mobile terminal 200 (S104). The transmitted rewriting program is temporarily stored in the mobile terminal 200.

The rewriting program stored in the mobile terminal 200 is transmitted to the key unit 100 through data communication between the mobile terminal 200 and the key unit 100. The data communication at this time is performed by data communication using BLE between the short-range communication unit 201 of the mobile terminal 200 and the short-range communication unit 103 of the key unit 100 similarly to the data communication of the locking/unlocking request and the terminal authentication information. A radio communication standard other than BLE can also be used in the data communication at this time.

As described above, the key unit 100 is supplied with electric power from the battery 13 of the vehicle 10. Accordingly, when data communication of the rewriting program is performed between the key unit 100 and the mobile terminal 200, the electric power of the battery 13 is consumed. Accordingly, when the data volume of the rewriting program received by the short-range communication unit 103 of the key unit 100 is large and data communication of the rewriting program is performed in a state in which the battery 13 of the vehicle 10 is not charged, a large amount of electric power is consumed in the reception process in the key unit 100 and thus there is concern that the amount of electric power remaining in the battery 13 may be excessively small. Therefore, in this embodiment, only when the internal combustion engine 11 is being driven, that is, only when the vehicle 10 is in a chargeable state in which the battery 13 can be charged by the power generator 12, data communication of the rewriting program between the mobile terminal 200 and the key unit 100 is performed.

Figure 6:
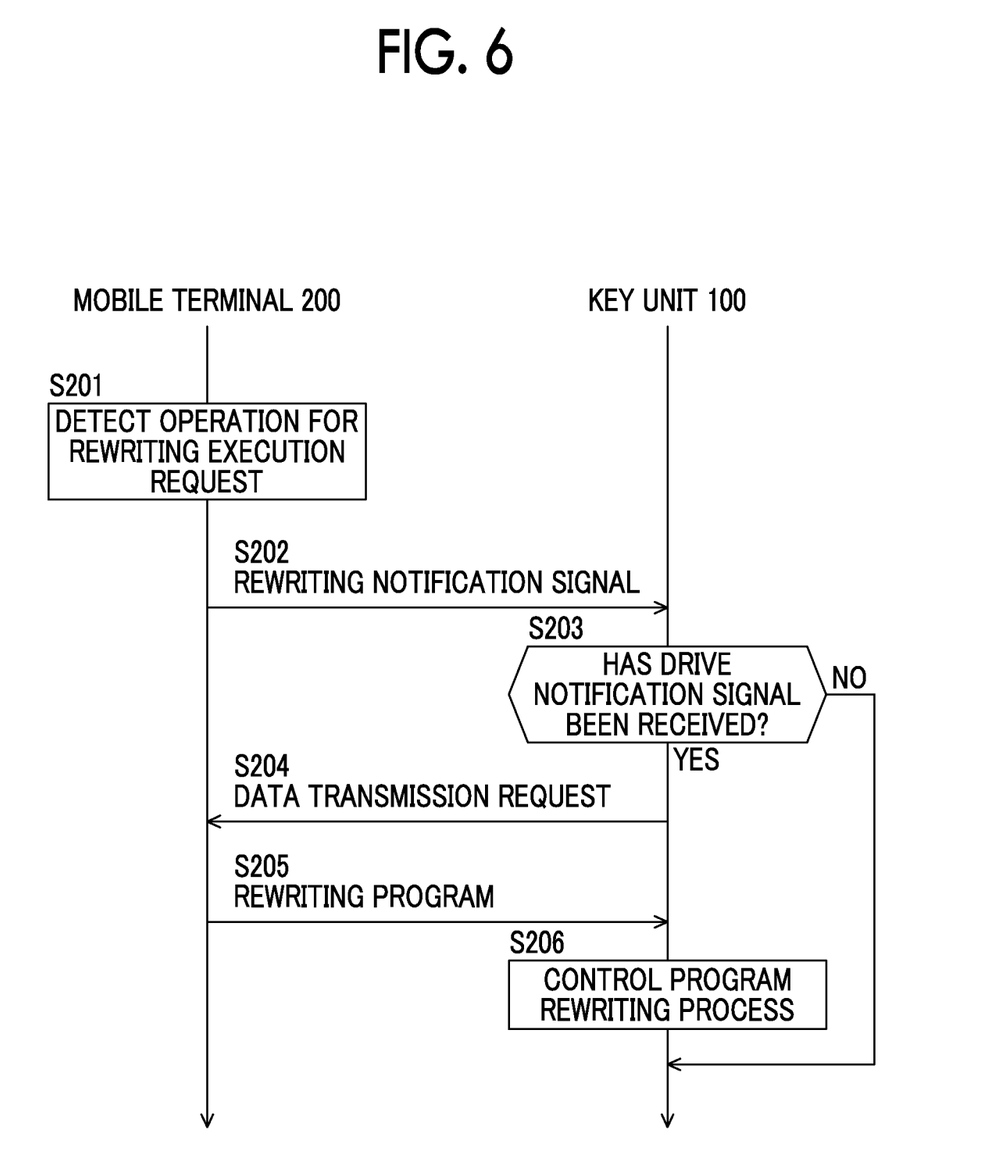
FIG. 6 is a flow diagram illustrating a flow of data communication and processing of a rewriting program between the mobile terminal and the key unit and a control program rewriting process in the key unit according to the first embodiment.

FIG. 6 is a flow diagram illustrating a flow of data communication and processing of the rewriting program between the mobile terminal 200 and the key unit 100 and a control program rewriting process in the key unit 100. Here, when a user performs an operation of setting rewriting of the control program in the key unit 100 through the input/output unit 204 of the mobile terminal 200, the mobile terminal 200 detects the operation (S201). When the operation is detected, the mobile terminal 200 transmits a rewriting notification signal indicating rewriting of the control program to the key unit 100 (S202). When the key unit 100 receives the rewriting notification signal, the control unit 104 determines whether a drive notification signal has been received by the reception unit 105 (S203). As described above, the drive notification signal is a signal which notifies that the internal combustion engine 11 is being driven and which is transmitted from the vehicle ECU 14. Accordingly, when the drive notification signal has been received by the reception unit 105, it can be determined that the internal combustion engine 11 is being driven. That is, it can be determined that the vehicle 10 is in the chargeable state.

Therefore, when the determination result of S203 is positive, the key unit 100 requests the mobile terminal 200 to transmit data of the rewriting program (S204). The mobile terminal 200 having received the request transmits the rewriting program to the key unit 100 (S205). At this time, when the rewriting program is received by the key unit 100, electric power of the battery 13 is consumed in the reception process (the rewriting program receiving process), but the battery 13 is charged with electric power corresponding to the consumed electric power by the power generator 12. All of transmission and reception of the rewriting notification signal in S202, transmission and reception of the data transmission request in S204, and transmission and reception of data of the rewriting program in S205 are performed through data communication using BLE between the short-range communication unit 201 of the mobile terminal 200 and the short-range communication unit 103 of the key unit 100. When data communication of the rewriting program is completed, the control unit 104 performs a process of rewriting the rewriting program, which has been newly acquired through the data communication, over the control program stored in the storage unit 1041 (a control program rewriting process) (S206).

On the other hand, when the determination result of S203 is negative, that is, when the drive notification signal has not been received by the reception unit 105, it can be determined that the internal combustion engine 11 is not being driven. That is, it can be determined that the vehicle 10 is not in the chargeable state. Therefore, when the determination result of S203 is negative, the key unit 100 does not request the mobile terminal 200 to transmit data of the rewriting program. As a result, the data communication of the rewriting program is not performed between the mobile terminal 200 and the key unit 100. That is, the rewriting program receiving process in the key unit 100 is not performed. In addition, the control program rewriting process in the key unit 100 is not performed.

When the determination result of S203 is negative, the key unit 100 may transmit a data communication non-permission notification indicating that the data communication of the rewriting program is not permitted because the internal combustion engine 11 is not being driven (that is, because the vehicle 10 is not in the chargeable state) to the mobile terminal 200. The mobile terminal 200 having received the data communication non-permission notification may notify the user that the notification has been received by display on a touch panel display or the like.

In this way, according to the flow illustrated in FIG. 6, only when the internal combustion engine 11 is being driven, that is, only when the vehicle 10 is in the chargeable state, the data communication of the rewriting program between the mobile terminal 200 and the key unit 100 is performed. Accordingly, it is possible to prevent the amount of electric power remaining in the battery 13 from becoming excessively small by performing the data communication of the rewriting program between the mobile terminal 200 and the key unit 100.

Modified Example 1

In this example, when the data communication of the rewriting program between the mobile terminal 200 and the key unit 100 is performed, the key unit 100 may authenticate the mobile terminal 200 similarly to that when locking or unlocking of the vehicle 10 is performed. In this case, when the mobile terminal 200 transmits the rewriting notification signal to the key unit 100 (S202 in FIG. 6), the terminal authentication information along with the rewriting notification signal is transmitted. The authentication unit 1042 of the key unit 100 compares the terminal authentication information transmitted from the mobile terminal 200 with the device authentication information stored in the storage unit 1041 and performs the authentication process. When the drive notification signal has been received by the reception unit 105 and authentication of the mobile terminal 200 by the authentication unit 1042 has succeeded, the key unit 100 requests the mobile terminal 200 to transmit data of the rewriting program (S204 in FIG. 6).

According to this configuration, when the vehicle 10 is in the chargeable state and authentication of the mobile terminal 200 has succeeded, the data communication of the rewriting program between the mobile terminal 200 and the key unit 100 is performed. Accordingly, it is possible to improve security in rewriting the control program in the key unit 100.

Modified Example 2

In this embodiment, the mobile terminal 200 having acquired the rewriting program from the server 400 may notify the user of a time required for the data communication of the rewriting program between the mobile terminal 200 and the key unit 100 (that is, a time required from start of the data communication to completion of the data communication) by display on a touch panel display or the like. According to this configuration, the user can determine a time point at which the data communication is performed based on the notified time required for the data communication of the rewriting program. In this case, the touch panel display (the input/output unit 204) of the mobile terminal 200 is an example of a "notification unit" in the claims.

Second Embodiment

The configuration of a locking/unlocking system and an onboard system according to this embodiment is the same as in the first embodiment. Points of rewriting of a control program in the key unit 100 according to this embodiment which are different from those in the first embodiment will be described below.

In this embodiment, similarly to the first embodiment, data communication of a rewriting program between the mobile terminal 200 and the key unit 100 is performed only when the internal combustion engine 11 is being driven, that is, only when the vehicle 10 is in the chargeable state. Here, even when the internal combustion engine 11 is being driven at a time point at which a rewriting notification signal transmitted from the mobile terminal 200 has been received by the key unit 100, driving of the internal combustion engine 11 may be stopped during execution of the data communication of the rewriting program (during execution of the rewriting program receiving process in the key unit 100). During rewriting of the control program m the key unit 100 (during execution of the control program rewriting process) after the completion of the data communication of the rewriting program, driving of the internal combustion engine 11 may be stopped. In this case, during execution of the data communication of the rewriting program or during rewriting of the control program in the key unit 100, the amount of electric power remaining in the battery 13 may become insufficient and the processes may be unintentionally stopped. Therefore, in this embodiment, when driving of the internal combustion engine 11 is stopped during execution of the rewriting program receiving process or the control program rewriting process in the key unit 100, the processes are intentionally stopped at that time.

Figure 7:
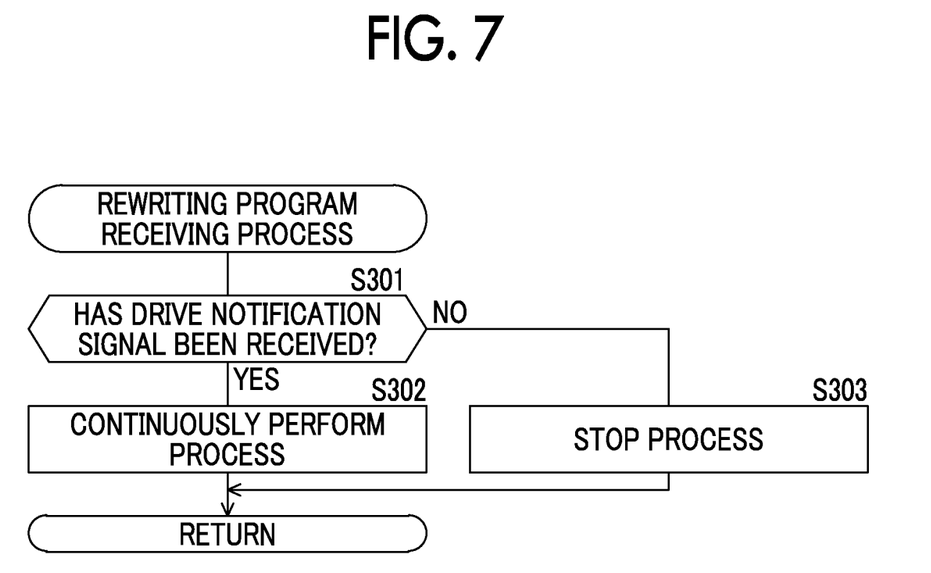
FIG. 7 is a flowchart illustrating a flow of a rewriting program receiving process in the key unit according to a second embodiment.

FIG. 7 is a flowchart illustrating a flow of the rewriting program receiving process which is performed by the control unit 104 of the key unit 100. This flow is repeatedly performed at predetermined intervals of time during execution of the data communication of the rewriting program between the mobile terminal 200 and the key unit 100. In this flow, in S301, the control unit 104 determines whether a drive notification signal is being received by the reception unit 105. That is, in this embodiment, when the data communication of the rewriting program is being performed as well as when the rewriting notification signal transmitted from the mobile terminal 200 has been received, the determination is repeatedly performed at predetermined intervals of time. When the determination result of S301 is positive, the control unit 104 continuously performs the rewriting program receiving process (S302). On the other hand, when the determination result of S301 is negative, the control unit 104 stops the rewriting program receiving process (S303). In this case, transmission of the rewriting program from the mobile terminal 200 is also stopped. Accordingly, the data communication of the rewriting program is intentionally stopped.

Figure 8:
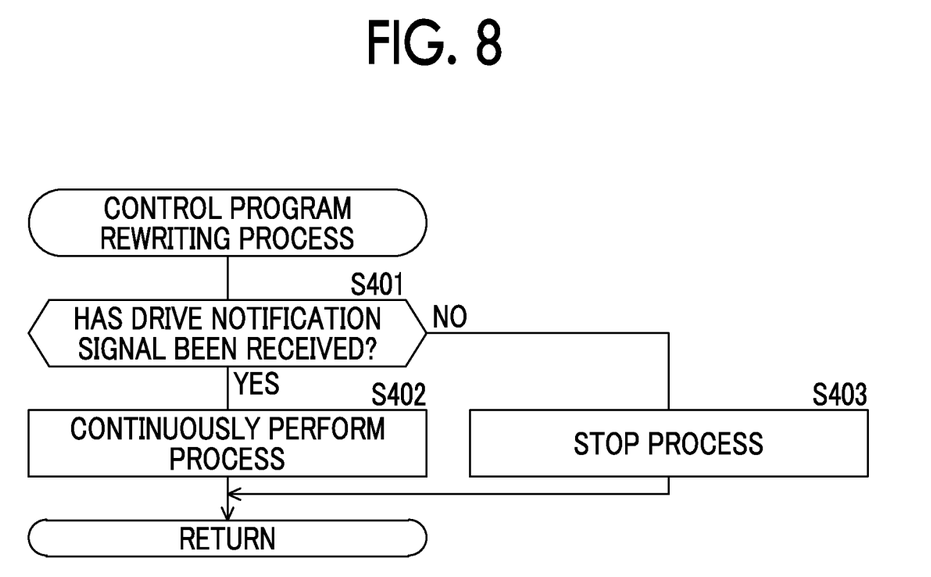
FIG. 8 is a flowchart illustrating a flow of a control program rewriting process in the key unit according to the second embodiment.

FIG. 8 is a flowchart illustrating the control program rewiring process which is performed by the control unit 104 of the key unit 100. This flow is repeatedly performed at predetermined intervals of time while rewriting of the control program is being performed in the key unit 100. In this flow, in S401, the control unit 104 determines whether the drive notification signal is being received by the reception unit 105. That is, in this embodiment, when rewriting of the control program is being performed, the determination is repeatedly performed at predetermined intervals of time. When the determination result of S401 is positive, the control unit 104 continuously performs the control program rewriting process (S402). On the other hand, when the determination result of S401 is negative, the control unit 104 stops the control program rewriting process (S403). Accordingly, rewriting of the control program in the storage unit 1041 of the key unit 100 is intentionally stopped.

In the flows illustrated in FIGS. 7 and 8, when driving of the internal combustion engine 11 has been stopped during execution of the data communication of the rewriting program or during rewriting of the control program, that is, when the vehicle 10 in the chargeable state departs from the chargeable state, the data communication of the rewriting program or rewriting of the control program is intentionally stopped. In other words, only when the state of the vehicle 10 is maintained in the chargeable state, the data communication of the rewriting program and rewriting of the control program are continuously performed. Accordingly, it is possible to prevent the data communication or rewriting of the control program from being unintentionally stopped because the amount of electric power remaining in the battery 13 becomes insufficient during execution of the data communication of the rewriting program or during rewriting of the control program.

When driving of the internal combustion engine 11 has been stopped and the data communication of the rewriting program or rewriting of the control program has been intentionally stopped, the key unit 100 may transmit this fact to the mobile terminal 200 and may notify the user of the fact by display on the touch panel display of the mobile terminal 200 or the like. The stopped process may be performed again after driving of the internal combustion engine 11 is restarted.

Other Embodiments

In the first and second embodiments, the onboard device according to the disclosure is set to the key unit. However, the onboard device according to the disclosure is not limited to the key unit. The disclosure can be applied to any device as long as it is a device that performs data communication of a rewriting program with a user's mobile terminal when a control program thereof is rewritten. For example, the disclosure may be applied to a telematics device.

The disclosure can be applied to an onboard device which is mounted in a hybrid vehicle including an internal combustion engine and a motor as drive sources. In a hybrid vehicle, even when the vehicle is in an EV traveling mode (a traveling mode in which the motor is used as a drive source) and driving of the internal combustion engine is stopped, the internal combustion engine can be automatically started to charge an auxiliary machine battery using a power generator. Accordingly, when the disclosure is applied to an onboard device mounted in the hybrid vehicle, the vehicle is in the chargeable state as long as the stopped internal combustion engine can be automatically started as well as when the internal combustion engine is being driven. The disclosure can also be applied to an onboard device which is mounted in an EV vehicle including a motor as a drive source.

What is claimed is:

1. An onboard device which is mounted in a vehicle including a battery and an internal power generator that charges the battery and which is supplied with electric power from the battery of the vehicle, the onboard device comprising:
a storage unit configured to store a control program for controlling the onboard device; and
a communication unit configured to perform data communication with a mobile terminal,
wherein the communication unit performs data communication of a rewriting program with the mobile terminal when the communication unit has received a rewriting notification signal indicating rewriting of the control program stored in the storage unit from the mobile terminal and the vehicle is in a chargeable state in which the battery is able to be charged by the internal power generator, and the communication unit does not perform data communication of the rewriting program with the mobile terminal when the vehicle is not in the chargeable state.

2. The onboard device according to claim 1, wherein:
the vehicle includes an internal combustion engine;
the internal power generator generates electric power using a driving force from the internal combustion engine;
the onboard device further includes a reception unit configured to receive a drive notification signal from the vehicle when the internal combustion engine in the vehicle is being driven; and
the communication unit performs data communication of the rewriting program with the mobile terminal when the communication unit has received the rewriting notification signal from the mobile terminal and the drive notification signal is being received by the reception unit, and the communication unit does not perform data communication of the rewriting program with the mobile terminal when the drive notification signal is not being received by the reception unit.

3. The onboard device according to claim 1, wherein when the vehicle in the chargeable state departs from the chargeable state during execution of data communication of the rewriting program between the communication unit and the mobile terminal or during execution of rewriting of the control program in the storage unit, data communication of the rewriting program between the communication unit and the mobile terminal or rewriting of the control program in the storage unit is stopped.

4. The onboard device according to claim 1, wherein:
the onboard device is a key unit configured to lock and unlock the vehicle;
   the key unit includes a transmission unit configured to transmit a locking/unlocking signal to a locking/unlocking device of the vehicle and an authentication unit configured to perform authentication using authentication information of the mobile terminal acquired through data communication by the communication unit; and
   the key unit transmits the locking/unlocking signal from the transmission unit to the locking/unlocking device when the authentication using the authentication information of the mobile terminal by the authentication unit succeeds.

5. The onboard device according to claim 4, wherein:
the authentication unit performs authentication using the authentication information of the mobile terminal acquired through data communication by the communication unit when the communication unit has received the rewriting notification signal from the mobile terminal; and
   data communication of the rewriting program between the communication unit and the mobile terminal is performed when the vehicle is in the chargeable state and the authentication using the authentication information of the mobile terminal by the authentication unit succeeds.

6. A mobile terminal that performs data communication with the onboard device according to claim 1 and transmits the rewriting notification signal to the onboard device in response to a user's input operation, the mobile terminal comprising:
   a notification unit configured to notify the user of a time required for data communication of the rewriting program between the mobile terminal and the onboard device.

* * * * *

UNITED STATES PATENT AND TRADEMARK OFFICE
CERTIFICATE OF CORRECTION

PATENT NO. : 10,607,429 B2
APPLICATION NO. : 16/108697
DATED : March 31, 2020
INVENTOR(S) : Yasuyuki Tamane, Tsukasa Takahashi and Masaki Oshima

It is certified that error appears in the above-identified patent and that said Letters Patent is hereby corrected as shown below:

Page 1 of 1

In the Specification

Column 3, Line 31, after "vehicle is", delete "m" and insert --in--, therefor.
Column 12, Line 49, after "program", delete "m" and insert --in--, therefor.
Column 13, Line 19, delete "rewiring" and insert --rewriting--, therefor.

Signed and Sealed this
Second Day of June, 2020

Andrei Iancu
*Director of the United States Patent and Trademark Office*